US010520604B2

(12) United States Patent
Corazza et al.

(10) Patent No.: US 10,520,604 B2
(45) Date of Patent: Dec. 31, 2019

(54) DETECTION MODULE OF A DISTURBANCE SIGNAL DURING INITIAL RECEIVING BY A RECEIVER OF NAVIGATION INFORMATION, RECEIVER COMPRISING SUCH MODULE, ASSOCIATED METHOD AND COMPUTER PROGRAM PRODUCT

(71) Applicant: Thales, Courbevoie (FR)

(72) Inventors: Stéphane Corazza, Valence (FR); Bruno Montagne, Valence (FR); Denis Bouvet, Valence (FR)

(73) Assignee: THALES, Courbevoie (FR)

( * ) Notice: Subject to any disclaimer, the term of this patent is extended or adjusted under 35 U.S.C. 154(b) by 268 days.

(21) Appl. No.: 15/715,185

(22) Filed: Sep. 26, 2017

(65) Prior Publication Data
US 2018/0100930 A1 Apr. 12, 2018

(30) Foreign Application Priority Data
Oct. 7, 2016 (FR) ...................... 16 01458

(51) Int. Cl.
*G01S 19/21* (2010.01)
*G01S 19/36* (2010.01)
(Continued)

(52) U.S. Cl.
CPC ............ *G01S 19/215* (2013.01); *G01S 19/36* (2013.01); *G01S 19/05* (2013.01); *G01S 19/20* (2013.01);
(Continued)

(58) Field of Classification Search
CPC ........ G01S 19/21; G01S 19/215; G01S 19/05; G01S 19/30; G01S 19/22; G01S 19/36;
(Continued)

(56) References Cited

U.S. PATENT DOCUMENTS

| 5,101,416 A * | 3/1992 | Fenton | ..................... G01S 19/21 |
| | | | 375/150 |
| 6,727,846 B1 * | 4/2004 | Brown | ..................... G01S 19/22 |
| | | | 342/357.63 |

(Continued)

FOREIGN PATENT DOCUMENTS

| EP | 2662706 A1 * | 11/2013 | ............. G01S 19/21 |
| EP | 2796895 A1 | 10/2014 | |

OTHER PUBLICATIONS

Daneshmand et al., "A low-complexity GPS anti-spoofing method using a multi-antenna array", Proceedings of the 25th International Technical Meeting of the Satellite Division of the Institute of Navigation, Sep. 17-21, 2012, pp. 1235-1243, The Institute of Navigation, Manassas, VA, USA.
Montgomery et al., "A multi-antenna defense: receiver-autonomous GPS spoofing detection", Mar. 1, 2009, pp. 40-46. http://www.insidegnss.com.auto/marapr09-montgomery.pdf.
French Patent Application No. 16 01458, Rapport de Recherche Préliminaire, Jun. 21, 2017, 3 pages.

*Primary Examiner* — Olumide Ajibade Akonai
(74) *Attorney, Agent, or Firm* — Soquel Group LLC

(57) ABSTRACT

A module making it possible to detect a disturbance signal during initial receiving by a receiver of navigation information, the receiver including a plurality of elementary antennas able to receive, in a plurality of arrival directions, electromagnetic signals including navigation information, a forming unit able to form a resultant signal from the electromagnetic signals and a processing unit able to process the resultant signal, the detection module being integrated into the forming unit and able to receive the electromagnetic signals coming from each of the elementary antennas, analyze the signals and detect a disturbance signal when the receiver is started cold in case of detection of a favored arrival direction of some of the electromagnetic signals.

9 Claims, 1 Drawing Sheet

(51) Int. Cl.
*H04B 1/10* (2006.01)
*G01S 19/05* (2010.01)
*G01S 19/20* (2010.01)
*G01S 19/22* (2010.01)
*H04B 1/709* (2011.01)

(52) U.S. Cl.
CPC ............ *G01S 19/22* (2013.01); *H04B 1/1027* (2013.01); *H04B 1/709* (2013.01)

(58) Field of Classification Search
CPC ....... G01S 5/0221; G01S 7/486; H04L 7/043; H04B 1/7103; H04B 1/7097; H04B 2201/709718; H04B 17/345; H04B 1/707; H04B 1/7107; H04B 1/709; H04B 1/1027; H04K 3/90; H04K 3/22; H04K 3/228; H04K 3/226; H04J 11/0023; H04W 24/00
See application file for complete search history.

(56) References Cited

U.S. PATENT DOCUMENTS

| | | | |
|---|---|---|---|
| 7,250,903 B1 * | 7/2007 | McDowell | G01S 19/215 342/357.59 |
| 8,655,298 B2 * | 2/2014 | Martin | G01S 19/21 375/316 |
| 2005/0215218 A1 * | 9/2005 | Bottomley | H04B 1/712 455/226.1 |
| 2011/0080320 A1 * | 4/2011 | Farrokhi | G01S 19/05 342/357.61 |
| 2012/0286994 A1 | 11/2012 | Letestu et al. | |

* cited by examiner

DETECTION MODULE OF A DISTURBANCE SIGNAL DURING INITIAL RECEIVING BY A RECEIVER OF NAVIGATION INFORMATION, RECEIVER COMPRISING SUCH MODULE, ASSOCIATED METHOD AND COMPUTER PROGRAM PRODUCT

CROSS REFERENCE TO RELATED APPLICATIONS

This application claims priority under 35 USC § 119 of French Patent Application No. 16 01458 filed on Oct. 7, 2016.

FIELD OF THE INVENTION

The present invention relates to a detection module of a disturbance signal during initial receiving by a receiver of navigation information. The present invention also relates to a receiver comprising such a module, an associated method and an associated computer program product.

BACKGROUND OF THE INVENTION

The navigation information comes from one or several satellites belonging to a global navigation satellite system (GNSS).

There are currently several GNSS systems, which in particular include the GPS system, the GLONASS system and the GALILEO system, which is expected to be brought online soon.

In general, a GNSS system is made up of a plurality of satellites emitting navigation information in the form of electromagnetic signals toward the Earth's surface.

The receiver is then able to receive these electromagnetic signals to extract the corresponding navigation information therefrom and, by analyzing navigation information from several satellites, to determine a navigation solution.

Such a navigation solution in particular includes the position of the receiver in a land reference, its speed and the time synchronized with the corresponding GNSS system.

The reception of the electromagnetic signals from the satellites can be prevented or disrupted by the presence of disturbance signals of various natures.

These disturbance signals in particular include malevolent signals aiming to scramble "pure" signals coming from satellites of the corresponding GNSS system and to thereby compromise the determination of the position by the receiver.

Some of these signals are similar to the signals emitted by the GNSS system and make it possible to deceive the receiver by causing it to determine a deliberately erroneous navigation solution.

In order to avoid these situations, some receivers make it possible to detect a "deception" situation, i.e., the presence of one or several malevolent signals near the receiver.

According to the state of the art, the detection of deception situations is based primarily on methods for verifying the consistency between the signals received by the receiver and secure information, i.e., information coming from a reliable source.

The secure information must then be known a priori by the receiver and for example comprise the speed of the receiver, the time or, at least partially, its position.

However, in general, this information cannot be known by the receiver when it is started cold. Starting cold thus refers to the state of the receiver in which no secure information is known by it. This state corresponds to the state of the receiver just after it is turned on.

For such a type of receivers, it is therefore necessary to provide at least one piece of secure information when they are started cold so that a deception situation can be detected.

One can thus see that this requires major operational constraints for the operation of this type of receiver.

SUMMARY OF THE DESCRIPTION

The present invention then aims to propose a module for detecting a disturbance signal for a receiver of a GNSS system making it possible to detect a deception situation when the receiver is started cold without any secure information being necessary.

To that end, the invention relates to a method for detecting a disturbance signal during initial receiving by a receiver of navigation information from one or several satellites belonging to a global satellite positioning system, the receiver including a plurality of elementary antennas able to receive, in a plurality of arrival directions, electromagnetic signals comprising navigation information, a forming unit able to form a resultant signal from the electromagnetic signals received by the elementary antennas and a processing unit able to process the resultant signal to extract navigation information therefrom.

The detection module is integrated into the forming unit and able to receive the electromagnetic signals coming from each of the elementary antennas, analyze the signals and detect a disturbance signal when the receiver is started cold in case of detection of a favored arrival direction of some of the electromagnetic signals.

According to other advantageous aspects of the invention, the detection module comprises one or more of the following features, considered alone or according to all technically possible combinations:

it includes a plurality of correlators, each correlator being associated with an elementary antenna and being able to calculate, over a given time interval, a correlation value between each electromagnetic signal from the corresponding elementary antenna and a reply signal stored in the receiver, the reply signal being predetermined as a function of the satellite from which the navigation information is expected;

it is further suitable for determining a given time interval, an inter-correlation matrix corresponding to the product of a first matrix made up of the correlation values determined for the same time interval from electromagnetic signals from different elementary antennas and different reply signals, and a second matrix equal to the first transposed conjugated matrix;

it is suitable for detecting a disturbance signal when the receiver is started cold when the rank of each inter-correlation matrix from among a plurality of inter-correlation matrices determined for different consecutive time intervals is strictly smaller than its size;

it is suitable for detecting a disturbance signal when the receiver is started cold when the determinant of each inter-correlation matrix from among a plurality of inter-correlation matrices determined for different consecutive time intervals is strictly below a predetermined threshold;

the predetermined threshold is less than 1, advantageously less than 0.5 and preferably substantially equal to 0.4;

if a disturbance signal is detected, it is suitable for notifying the processing unit of the receiver.

The invention also relates to a receiver of navigation information from one or several satellites belonging to a global satellite positioning system, the receiver including a plurality of elementary antennas able to receive electromagnetic signals in a plurality of arrival directions, a forming unit able to form a resultant signal from the electromagnetic signals received by the elementary antennas and a processing unit able to process the resultant signal to extract navigation information therefrom, the receiver being characterized in that the forming unit includes a module for detecting a disturbance signal.

The invention also relates to a method for detecting a disturbance signal carried out by a detection module as previously described when the receiver is started cold, the method including the following steps:

acquiring electromagnetic signals from each of the elementary antennas;

analyzing the received electromagnetic signals; and detecting a disturbance signal if a favored arrival direction of at least some of the electromagnetic signals is detected.

The invention also relates to a computer program product including software instructions which, when implemented by computer equipment, carry out the method as defined above.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION

In the rest of the description, the expression "substantially equal to" refers to an equality relationship to within plus or minus 10%.

Figure 1:
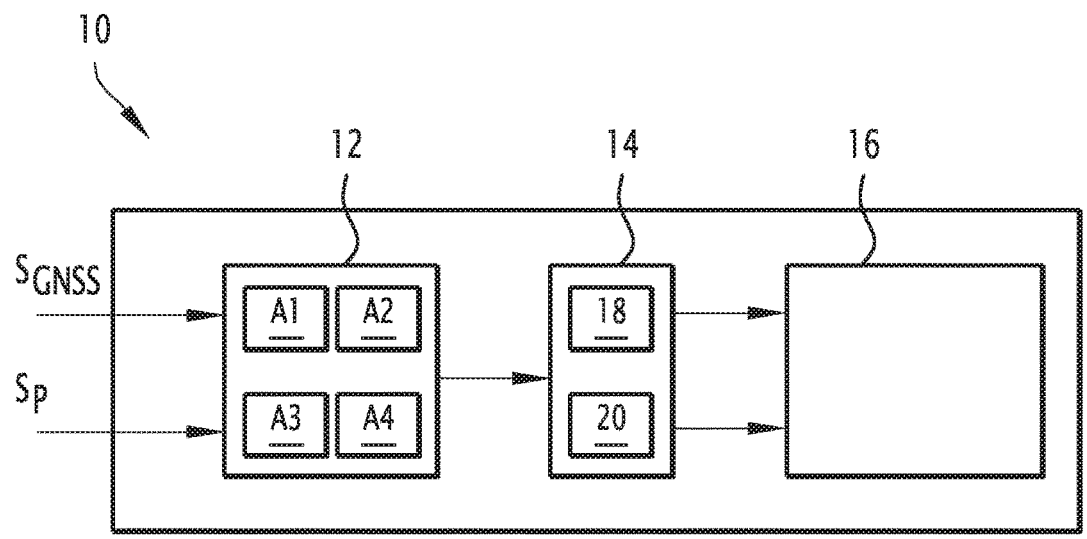
FIG. 1 is a schematic view of a receiver of navigation information according to the invention, the receiver in particular including a module for detecting a disturbance signal according to the invention.

FIG. 1 shows a receiver 10 of navigation information from a global navigation satellite system (GNSS).

In a known manner, such a positioning system includes a plurality of satellites arranged in different orbits around the Earth.

The total number of satellites is for example equal to 30.

Each satellite is able to transmit navigation information in the form of electromagnetic signals toward part of the Earth's surface that it is flying over.

Each item of navigation information in particular comprises the transmission time of the corresponding signal, the current ephemerids and almanac of the satellite from which the signal was emitted.

In reference to FIG. 1, the receiver 10 comprises an antenna 12, a forming unit 14 and a processing unit 16.

The antenna 12 comprises M elementary antennas, M being an integer greater than one.

Each of these elementary antennas will be referred to hereinafter by the reference of type $A_m$, where m is a natural number varying between 1 and M, and referring to the number of the corresponding elementary antenna.

In the example embodiment of FIG. 1, the total number M of elementary antennas $A_m$ is equal to 4.

Each elementary antenna $A_m$ defines a receiving surface and is able to receive electromagnetic signals arriving on this receiving surface along a plurality of arrival directions.

Each arrival direction is in particular defined by an angle of incidence formed between the receiving surface of the corresponding antenna $A_m$ and a straight line along which the corresponding electromagnetic signals propagate.

The electromagnetic signals received by the elementary antenna $A_m$ having number m will be referred to hereinafter by reference $RFin_m$.

These signals $RFin_m$ are variable over time and in particular comprise signals $S_{GNSS}$ emitted by the positioning system and at least one disturbance signal $S_p$ intended to undermine the operation of the receiver 10.

The forming unit 14 is an electronic component of the receiver 10 that is able to acquire the electromagnetic signals $RFin_m$ received by the elementary antennas $A_m$ and to process these signals as will be explained below.

In particular, the forming unit 14 includes a forming module 18 known in itself and making it possible to form a resultant signal from electromagnetic signals $RFin_m$ received by the elementary antennas $A_m$, and a module 20 for detecting a disturbance signal $S_p$ explained in detail below.

The processing unit 16 is able to acquire the resultant signal formed by the forming module 18 to extract the navigation information transmitted by one or several satellites therefrom.

The processing unit 16 is further suitable for processing the navigation information to determine a navigation solution relative to the receiver 10.

This navigation solution in particular comprises the position of the receiver in a land reference, its speed and the time synchronized with the positioning system.

The processing unit 16 for example assumes the form of a computer implementing a plurality of software programs configured to process the navigation information using methods known in themselves.

Figure 2:
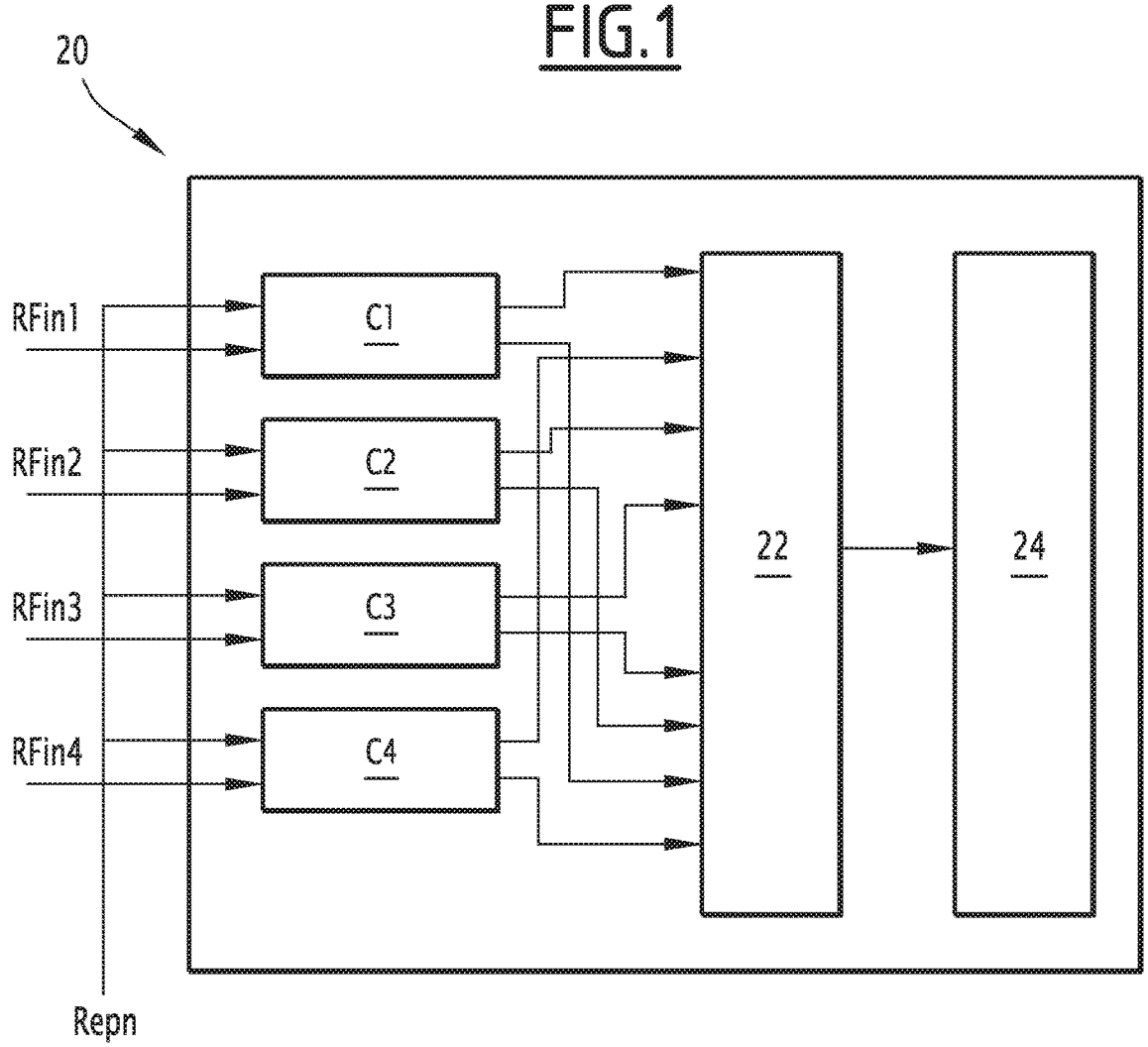
FIG. 2 is a detailed schematic view of the detection module of FIG. 1.

The detection module 20 is illustrated in more detail in FIG. 2.

Thus, in reference to this figure, the detection module 20 includes a correlator $C_m$ for each elementary antenna $A_m$, a processing circuit 22 and an analyzer 24.

The detection module 20 for example assumes the form of a mini-computer implementing the operation of each correlator $C_m$, the processing circuit 22 and the analyzer 24.

According to one alternative embodiment, the detection module 20 assumes the form of an integrated electronic circuit that implements the operation of each correlator $C_m$, the processing circuit 22 and the analyzer 24.

Each correlator $C_m$ is able to acquire the electromagnetic signals $RFin_m$ from the corresponding elementary antenna $A_m$ and reply signals $Rep_n$ for example stored in the processing unit 16 of the receiver 10, where n is a natural number varying from 1 to N.

The total number N of the reply signals is a natural number greater than one. In the described example embodiment, the number N is for example equal to 4.

Each reply signal $Rep_n$ is predetermined and is provided by the operator of the corresponding positioning system. This signal is specific to each satellite and in particular makes it possible to extract the navigation information contained in the electromagnetic signals from this satellite using a method known in itself.

A reply signal is also referred to as spreading code.

Each correlator $C_m$ is further able to calculate, over a given time interval, a correlation value $c_{mn}$ between the corresponding signal $Rfin_m$ and each of the reply signals $Rep_n$.

In other words, the correlation value $c_{mn}$ is determined according to the following expression:

$$c_{mn}(k) = \int_{kT}^{(k+1)T} (RFin_m(t))^* Rep_n(t) \cdot dt,$$

where $(f)^*$ refers to the conjugate of a signal f;

k is an integer determining the time interval in question; and

T is the duration of each interval, which is for example substantially equal to 1 ms.

The correlators $C_m$ are further suitable for providing the processing circuit 22 with the correlation values $c_{mn}$ determined for each time interval in question.

The processing circuit 22 is able to perform spatial processing of the correlation values $c_{mn}$.

In particular, for each time interval in question, the processing circuit 22 is able to determine an inter-correlation matrix R defined by the following expression:

$$R = C \cdot C^H,$$

where

C is a matrix including N rows and M columns and made up of correlation values $c_{mn}$ for a same time interval; and $C^H$ is the transposed conjugated matrix of the matrix C.

The processing circuit is further able to determine, for each time interval in question, the absolute value $L = \|\det R\|$ of the determinant of the inter-correlation matrix R.

This value L is determined according to numerical methods known in themselves. One example of such a method is the Laplace method.

The analyzer 24 is suitable for acquiring several values L corresponding to different time intervals, preferably consecutive. The number of considered intervals is for example equal to 4.

The analyzer 24 is further suitable for comparing the acquired values L with a predetermined threshold Th that is for example below 1, preferably below 0.5, and advantageously substantially equal to 0.4.

Lastly, when each considered value L is below the threshold Th, the analyzer 24 is able to send a notice of detection of a disturbance signal $S_p$ to the processing unit 16 of the receiver 10.

A method for detecting a disturbance signal $S_p$ implemented by the detection module 14 will now be explained.

Initially, the receiver 10 is off. In other words, the receiver 10 does not include any secure information regarding its current position, its speed or the time of the positioning system.

When the operation of the receiver 10 is activated, the processing module 16 sends the detection module 20 a cold start notice of the receiver 10. This notice then activates the operation of the detection module 20.

During an initial step of the method, the correlators $C_m$ acquire the electromagnetic signals $RFin_m$ from the corresponding elementary antennas $A_m$ and the reply signals $Rep_n$.

Then, the correlators $C_m$ calculate the correlation values $c_{mn}$ corresponding to these signals for several time intervals.

During a following step, the processing circuit 22 determines, for each considered time interval, the absolute value L of the determinant of the inter-correlation matrix R formed by the correlation values $c_{mn}$ determined for this time interval.

During a following step, the analyzer 24 compares the values L with the predetermined threshold Th.

When, during this step, $\max_k(L) < Th$, i.e., when the maximum value of the values L is below the predetermined threshold Th, the analyzer 24 sends a notice to the processing unit 16 indicating the presence of a disturbance signal $S_p$.

In this case, the processing unit 16 for example notifies the user thereof and ignores the navigation information extracted from the corresponding signals.

One can then see that the invention has a certain number of advantages.

Indeed, disturbance signals intended to deceive a receiver are generally emitted toward that receiver. These signals therefore arrive along a favored arrival direction toward the elementary antennas of the receiver.

A favored arrival direction thus refers to a plurality of arrival directions whereof each pair of directions forms an angle for example smaller than 5°, advantageously smaller than 2°.

The detection module and the detection method implemented by this module make it possible to detect a favored arrival direction of at least two electromagnetic signals from among the signals received during several consecutive time intervals of predetermined length.

The duration of this interval is for example substantially equal to 4 ms.

When a favored arrival direction is detected, the module deduces the presence of a disturbance signal.

The favored arrival direction is detected by implementing an analysis of the phase coherence of electromagnetic signals received by the various elementary antennas.

In particular, during this analysis, the detection module determines an inter-correlation matrix corresponding to these signals.

If the signals come from N different arrival directions, then the vectors forming the columns of this matrix are linearly independent.

If a favored arrival direction exists, the number of actual arrival directions is less than N and the independence property is then lost.

In the described example embodiment, to detect a dependence of at least some columns of the matrix R, its determinant is calculated and next compared to a threshold, the value of which is configurable. This value is close to zero.

However, one skilled in the art will understand that many other methods for detecting dependent columns in an inter-correlation matrix, and more generally, for detecting a favored arrival direction, can be applied to carry out the invention.

Thus, the detection method described above represents only one example embodiment making it possible to identify a favored arrival direction.

It is also clear that it is not necessary to have secure information to detect such a favored arrival direction, such that the method according to the invention is particularly advantageous when it is implemented when the receiver is started cold.

The invention claimed is:

1. A detection module for detecting a disturbance signal during initial receiving by a receiver of navigation information from one or several satellites belonging to a global satellite positioning system, the receiver including a plurality of elementary antennas able to receive, in a plurality of arrival directions, electromagnetic signals comprising navigation information, a forming unit able to form a resultant signal from the electromagnetic signals received by the elementary antennas, and a processing unit able to process the resultant signal to extract navigation information therefrom, the detection module comprising a plurality of correlators, each correlator being associated with an elementary antenna and being able to calculate, over a given time interval, a correlation value between each electromagnetic signal from the corresponding elementary antenna and a reply signal stored in the receiver, the reply signal being predetermined as a function of the satellite from which the navigation information is expected, wherein the detection module is integrated into the forming unit and able to receive the electromagnetic signals coming from each of the elementary antennas, analyze these signals and detect a disturbance signal when the receiver is started cold in case of detection of a favored arrival direction of some of the electromagnetic signals, wherein the detection module is further suitable for determining a given time interval, an inter-correlation matrix corresponding to the product of a first matrix made up of the correlation values determined for the same time interval from electromagnetic signals from different elementary antennas and different reply signals, and a second matrix equal to the first transposed conjugated matrix, and wherein the detection module is suitable for detecting a disturbance signal when the receiver is started cold when the determinant of each inter-correlation matrix from among a plurality of inter-correlation matrices determined for different consecutive time intervals is strictly below a predetermined threshold.

2. The module according to claim 1, suitable for detecting a disturbance signal when the receiver is started cold when the rank of each inter-correlation matrix from among a plurality of inter-correlation matrices determined for different consecutive time intervals is strictly smaller than its size.

3. The module according to claim 1, wherein the predetermined threshold is less than 1.

4. The module according to claim 3, wherein the predetermined threshold is less than 0.5.

5. The module according to claim 4, wherein the predetermined threshold is substantially equal to 0.4.

6. The module according to claim 1, wherein if a disturbance signal is detected, it is suitable for notifying the processing unit of the receiver.

7. A receiver of navigation information from one or several satellites belonging to a global satellite positioning system, the receiver comprising:
   a plurality of elementary antennas able to receive electromagnetic signals in a plurality of arrival directions;
   a forming unit able to form a resultant signal from the electromagnetic signals received by the elementary antennas; and
   a processing unit able to process the resultant signal to extract navigation information therefrom,
wherein said forming unit includes a module for detecting a disturbance signal according to claim 1.

8. A method for detecting a disturbance signal carried out by a detection module according to claim 1 when the receiver is started cold, the method comprising:
   acquiring electromagnetic signals from each of the elementary antennas;
   analyzing the received electromagnetic signals; and
   detecting a disturbance signal if a favored arrival direction of at least some of the electromagnetic signals is detected.

9. A non-transitory computer readable medium storing instructions, which, when executed by a processor of a piece of computer equipment, cause the processor to perform the method according to claim 8.

* * * * *